US012115426B1

(12) United States Patent
Person

(10) Patent No.: US 12,115,426 B1
(45) Date of Patent: Oct. 15, 2024

(54) PHYSICAL SPORTS AND RECREATION EQUIPMENT ENABLED AND INTEGRATED WITH MOBILE COMPUTING DEVICES FOR GAME PLAY EXPERIENCES

(71) Applicant: Thomas Person, Louisville, KY (US)

(72) Inventor: Thomas Person, Louisville, KY (US)

(*) Notice: Subject to any disclaimer, the term of this patent is extended or adjusted under 35 U.S.C. 154(b) by 790 days.

(21) Appl. No.: 17/156,288

(22) Filed: Jan. 22, 2021

Related U.S. Application Data

(60) Provisional application No. 62/964,572, filed on Jan. 22, 2020.

(51) Int. Cl.

| A63B 67/06 | (2006.01) |
|---|---|
| A63F 7/30 | (2006.01) |
| G16Y 20/20 | (2020.01) |
| G16Y 30/00 | (2020.01) |
| G16Y 40/35 | (2020.01) |
| H04W 4/80 | (2018.01) |

(52) U.S. Cl.
CPC ............... *A63B 67/06* (2013.01); *A63F 7/30* (2013.01); *G16Y 20/20* (2020.01); *G16Y 30/00* (2020.01); *G16Y 40/35* (2020.01); *H04W 4/80* (2018.02); *A63F 2007/3085* (2013.01)

(58) Field of Classification Search
CPC .................................. A63F 7/30; A63B 67/06
USPC ....... 273/354, 355, 356, 359, 366, 368, 371, 273/381, 382, 389, 398, 402
See application file for complete search history.

(56) References Cited

U.S. PATENT DOCUMENTS

| 3,480,280 | A | | 11/1969 | Gamertsfelder | |
|---|---|---|---|---|---|
| 3,794,318 | A | * | 2/1974 | Holmes | A63B 63/06 273/354 |
| 4,923,201 | A | * | 5/1990 | Nichol | A63F 9/02 273/127 R |
| 4,927,160 | A | * | 5/1990 | Nichol | A63F 9/02 273/DIG. 26 |
| 4,961,586 | A | | 10/1990 | Conville | |
| 5,765,832 | A | * | 6/1998 | Huff | A63B 63/08 273/354 |
| 7,611,147 | B2 | * | 11/2009 | Sheldon | F41J 7/04 273/366 |
| 7,854,528 | B2 | * | 12/2010 | Segretto | A63B 63/08 362/249.05 |
| 7,887,059 | B2 | * | 2/2011 | Kiernan | A63B 63/08 273/317.2 |
| 7,900,927 | B1 | * | 3/2011 | Bliehall | F41J 9/02 273/390 |
| 8,277,344 | B2 | | 10/2012 | Cea et al. | |

(Continued)

OTHER PUBLICATIONS

U.S. Pat. No. 285,396 issued Sep. 25, 1883 Name of Patenee: De Windt (I could not get the form to accept the patent No. because the number was too short.).

*Primary Examiner* — Joseph B Baldori
(74) *Attorney, Agent, or Firm* — Law Office of J. L. Simunic; Joan L. Simunic

(57) ABSTRACT

The present development is a system for participating in a multi-player game through IoT digital arenas. The IoT digital arena system of the present development comprises an interactive playing surface, and a means to interact with the playing surface and to receive feedback from the playing surface. Optionally, players may be digitally tagged to allow for digital interaction between the players and the playing surface and between the player and the means to interact with the playing surface.

7 Claims, 9 Drawing Sheets

(56) References Cited

U.S. PATENT DOCUMENTS

| | | | |
|---|---|---|---|
| 8,777,226 B1* | 7/2014 | Decker, Jr. | F41J 7/06 463/2 |
| 8,807,569 B1* | 8/2014 | Davis | F41J 5/20 473/570 |
| 9,248,357 B2 | 2/2016 | Francis | |
| 9,541,356 B2* | 1/2017 | Bullis | F41J 1/10 |
| 9,962,586 B2 | 5/2018 | Bonventre et al. | |
| 10,088,281 B2* | 10/2018 | Kaufman | F41J 7/06 |
| 10,105,583 B2* | 10/2018 | Deveaux | A63B 71/06 |
| 10,226,675 B2 | 3/2019 | Wilder | |
| 10,286,276 B2 | 5/2019 | O'Neill | |
| 11,331,550 B1 | 5/2022 | Showalter | A63B 71/0669 |
| 11,607,593 B2* | 3/2023 | Hatchett | A63B 67/06 |
| 11,648,453 B2* | 5/2023 | Michael | A63B 67/06 273/372 |
| 2008/0023915 A1* | 1/2008 | Morrow | F41J 1/10 273/366 |
| 2012/0218633 A1* | 8/2012 | Cincotti | G02B 3/005 359/619 |
| 2014/0091525 A1 | 4/2014 | Ramirez | |
| 2014/0217674 A1* | 8/2014 | Kochuba | F41J 9/00 273/359 |
| 2014/0239594 A1 | 8/2014 | Deloatch | |
| 2016/0061570 A1* | 3/2016 | Bullis | F41J 5/18 273/383 |
| 2016/0091285 A1* | 3/2016 | Mason | F41J 5/14 273/372 |
| 2017/0138586 A1 | 5/2017 | Finch et al. | |
| 2017/0340949 A1 | 11/2017 | Tsai | |
| 2018/0200631 A1* | 7/2018 | Miller | A63F 9/0243 |
| 2019/0232138 A1* | 8/2019 | Bartels | A63B 69/0053 |
| 2020/0298079 A1* | 9/2020 | Mullins | A63B 71/0669 |
| 2021/0308550 A1* | 10/2021 | Li | A63B 71/0622 |
| 2021/0346780 A1* | 11/2021 | Hale | A63B 71/0622 |
| 2022/0032157 A1* | 2/2022 | Theobald | G08B 5/38 |
| 2022/0096909 A1* | 3/2022 | Russell | H05B 47/13 |

* cited by examiner

Gameboard is placed on the ground in accordance with game play rules

Ring / Gameboard is turned on

Ring / Gameboard runs self-diagnostics

Ring begins to rotate in one direction either clockwise or counter-clockwise. Direction to be randomly selected by on board processor/servo motor as will speed of rotation and the starting and stopping of rotation Player(s) toss bean bags at Ring / Gameboard. If only the Ring / Gameboard is being used with the bean bags and there is no connection to the mobile computing device and the gameplay software, the bean bags will still trigger an event and return that value to the ring, thus triggering an event which will cause the ring to display visual feedback.

In accordance with game play rules player/s begun to toss bags at the apparatus until game play is complete.

FIGURE 6A

Gameboard is placed on the ground in accordance with game play rules

Ring / Gameboard is turned on

Ring / Gameboard runs self-diagnostics

Ring begins to rotate in one direction either clockwise or counter-clockwise. Direction to be randomly selected by on board processor/servo motor as will speed of rotation and the starting and stopping of rotation Ring / Gameboard broadcasts BLE continuous signal or beacon signal; Bags broadcast BLE continuous signal Ring / Gameboard runs trigger event to check for connection to mobile computing device or bean bag Ring / Gameboard if connection to mobile computing device returns positive then ID tags and ID events are registered with software application for game play Mobile computing device is running software awaiting event triggers and is connected to Ring / Gameboard via Bluetooth / Wifi, Within the software used in tandem with Ring / Gameboard the players register themselves and register the bean bags to be used for their game play with a specific Ring / Gameboard Ring / Gameboard broadcasts BLE continuous signal – beacon signal awaiting trigger events from bag – BT signal Ring / Gameboard displays the ready color (glowing light) default color of white

*Players toss bean bags at Ring / Gameboard*. If bag passes thru ring and resides on the ground then an event is triggered between the bag and the ring and the software on the mobile computing registers the event as 1) a "game point" in credit to the player whose bag is registered on the software, 2) the Ring displays visual feedback.

Alternatively – if only the Ring / Gameboard is being used with the bean bags and there is no connection to the mobile computing device and the gameplay software, the bean bags will still trigger an event and return that value to the ring, thus triggering and event which will cause the ring to display visual feedback.

After event trigger is passed the Ring / Gameboard is reset and broadcasts continuous BLE signal awaiting trigger event.

Ring / Gameboard turns itself off after a set period of time of no activity.

FIGURE 6B

> Same as Figure 6B until
> *Players toss bean bags at Ring / Gameboard*

*Players toss bean bags at Ring / Gameboard.* If bag passes thru ring and resides on the ground then an event is triggered between the bag and the ring and the software on the mobile computing registers the event as 1) a "game point" in credit to the player whose bag is registered on the software, 2) the Ring displays visual feedback.

> Alternatively – if only the Ring / Gameboard is being used with the bean bags and there is no connection to the mobile computing device and the gameplay software, the bean bags will still trigger an event and return that value to the ring, thus triggering and event which will cause the ring to display visual feedback.

> Alternatively – if there is a connection to the mobile computing device and the game play software, the physical player/s software application can allow a virtual player to join the game play experience via the "software" version of the Ring / Gameboard enabling the virtual player to CCCI the Gameboard in accordance with the rules of game play; toss virtual BiGG Baggs, CCCI the Gameboard, trigger an event and return that value to the Ring, thus triggering and event which will cause the ring to display visual feedback during a game play session.

> Alternatively – if there is a connection to the mobile computing device and the game play software, the physical player/s software application can allow a virtual participant to join the game play experience via the "software" version of the Ring / Gameboard enabling the virtual participant to CCCI the Gameboard in accordance with the rules of game play; CCCI the Gameboard, trigger an event and return that value to the Ring, thus triggering and event which will cause the ring to display visual feedback during a game play session.

After event trigger is passed the Ring / Gameboard is reset and broadcasts continuous BLE signal awaiting trigger event.

At the end of a game play session the physical player/s may disconnect any virtual player/s or participants/s from the Ring / Gameboard.

Ring / Gameboard turns itself off after a set period of time of no activity.

FIGURE 6C

> Same as Figure 6B until
> *Players toss bean bags at Ring / Gameboard*

*Players toss bean bags at Ring / Gameboard*. If bag passes thru ring and resides on the ground then an event is triggered between the bag and the ring and the software on the mobile computing registers the event as 1) a "game point" in credit to the player whose bag is registered on the software, 2) the Ring displays visual feedback.

> Alternatively – if only the Ring / Gameboard is being used with the bean bags and there is no connection to the mobile computing device and the gameplay software, the bean bags will still trigger an event and return that value to the ring, thus triggering and event which will cause the ring to display visual feedback.

> Alternatively – if there is a connection to the mobile computing device and the game play software, the physical player/s software application can allow a virtual player to join the game play experience via the "software" version of the Ring / Gameboard enabling the virtual player to CCCI the Gameboard in accordance with the rules of game play; toss virtual BiGG Baggs, CCCI the Gameboard, trigger an event and return that value to the Ring, thus triggering and event which will cause the ring to display visual feedback during a game play tournament.

> Alternatively – if there is a connection to the mobile computing device and the game play software, the physical player/s software application can allow a virtual participant to join the game play experience via the "software" version of the Ring / Gameboard enabling the virtual participant to CCCI the Gameboard in accordance with the rules of game play; CCCI the Gameboard, trigger an event and return that value to the Ring, thus triggering and event which will cause the ring to display visual feedback during a game play tournament.

After event trigger is passed the Ring / Gameboard is reset and broadcasts continuous BLE signal awaiting trigger event.

At the end of a game play session the physical player/s may disconnect any virtual player/s or participants/s from the Ring / Gameboard.

Ring / Gameboard turns itself off after a set period of time of no activity.

FIGURE 6D

Same as Figure 6B until
*Players toss bean bags at Ring / Gameboard*

*Players toss bean bags at Ring / Gameboard.* If bag passes thru ring and resides on the ground then an event is triggered between the bag and the ring and the software on the mobile computing registers the event as 1) a "game point" in credit to the player whose bag is registered on the software, 2) the Ring displays visual feedback.

Alternatively – if only the Ring / Gameboard is being used with the bean bags and there is no connection to the mobile computing device and the gameplay software, the bean bags will still trigger an event and return that value to the ring, thus triggering and event which will cause the ring to display visual feedback.

Alternatively – if there is a connection to the mobile computing device and the game play software, the physical player/s via the Ring / Gameboard software application can allow a virtual player avatar to join the game play experience. During this game play experience as the physical player engages in the *physical* game play experience the avatar of the virtual player represents and puts forth CCCI toward the Ring / Gameboard game play experience in accordance with actions or responses that represent previous interaction of and by the individual player represented by the avatar. If a virtual player has not in their prior *physical* game play experience conducted such action to be similar or appropriate in response to a current game play experience their avatar cannot do such either (if an individual player has never conducted such an action during a physical game play experience than neither may their avatar)

After event trigger is passed the Ring / Gameboard is reset and broadcasts continuous BLE signal awaiting trigger event.

At the end of a game play session the physical player/s may disconnect any virtual player/s or participants/s from the Ring / Gameboard.

Ring / Gameboard turns itself off after a set period of time of no activity.

FIGURE 6E

PHYSICAL SPORTS AND RECREATION EQUIPMENT ENABLED AND INTEGRATED WITH MOBILE COMPUTING DEVICES FOR GAME PLAY EXPERIENCES

CROSS-REFERENCE TO PRIOR APPLICATIONS

The present application claims priority to U.S. Patent 62/964,572, which is incorporated herein in its entirety by reference.

FIELD OF THE INVENTION

The invention relates to the field of tossing games and entertainment devices. More particularly, the present invention pertains to a new and improved system for participating in a multi-player game through IoT digital arenas.

BACKGROUND OF THE INVENTION

Cornhole is a lawn game in which players take turns tossing bean bags at a platform or board having at least one hole or aperture at one end and wherein the platform is slightly elevated on the aperture end. Normally, the game includes a pair of platforms which are set a predetermined distance apart prior to initiating game play. Players stand next to one platform and face towards the opposing platform where they will throw the bags. Players take turns tossing their bean bags at the platform, with the goal being to toss the bag into the hole or to have it land on the platform. Conventional rules award higher points for tossing the bag through the hole, and fewer points for landing on the platform. The game is continued until one team reaches a predetermined score.

The speed and trajectory of the bag when tossed affects whether the bag will go through the hole or hit, or stay on, the platform. Because the platform is elevated on one side, the platform forms an angle with the ground. It is common for the platform face to have a smooth surface and may even be polished to make the face somewhat slippery so tossed bags risk sliding off the platform if not tossed through the hole. This adds to the challenge of the game. An experienced player can often overcome this risk by knowing how hard to toss the bag or where to hit the platform. Thus, after several rounds of play, Cornhole can lose its challenge for players.

With the development of computerized games and entertainment options, physical activity among children and adults has declined in recent years as games became more visual and keyboard/console centric. Sports and recreation games that have tangible non-electronic components and required various levels of physical exertion exist but are not enabled or integrated with mobile computing devices that would allow and foster physical activity amongst individuals of various ability and capacity.

Further, traditional games having physical structures, such as Cornhole, are often limited by configuration of the playing surfaces and normally require all players to be in close geographic and temporal proximity to the game's playing surface or environment. Potential participants may find these requirements to be unenjoyable, old-fashioned, boring or unavailable. In addition, players are often limited with respect to customizing the playing surface, game play conditions or environment—particularly once the game has started. By contrast, digital games often provide the player with multiple customization options and provide a technical user interface that is expected in modern-day products.

The tossing game of the present development combines mechanical, hardware, electrical and software technology to create a particular game play experience that enables and allows participants of various physical and/or mental capacity and/or ability to participate in a game experience that uncommonly equalizes and randomizes the circumstance of participation and game play experience regardless of physical location, physical/mental ability, virtual/physical presence, geographical location or time zone.

SUMMARY OF THE PRESENT INVENTION

The present development is a system for participating in a multi-player game through Internet of Things or "IoT" digital arenas as expressed in terms of an improvement to the well-known Cornhole game apparatus. The IoT digital arena system of the present development comprises an interactive playing surface, and a means to interact with the playing surface and to receive feedback from the playing surface. Optionally, players may be digitally tagged to allow for digital interaction between the players and the playing surface and between the player and the means to interact with the playing surface.

Using the Cornhole game as an example, the game apparatus of the present development comprises a Cornhole platform or board having at least one aperture on one end. The aperture end is slightly elevated for game play. Positioned in the platform aperture is a disc. The disc defines a center and has at least one aperture having a fixed position, wherein that position is off-center relative to the center of the disc. The disc is adapted to rotate within the platform aperture. Rotation of the disc is controlled by a set of gears that are adapted to wirelessly command, control, communicate and interact with at least one mobile computing device. The disc aperture further comprises an IoT beacon to digitally recognize when a bag is tossed through the disc aperture or is in proximity of the aperture, and more preferably to digitally recognize exactly which bag is tossed through the disc aperture. In order to provide the individualized bag recognition, a battery free Bluetooth tag is positioned within on upon each bag.

DETAILED DESCRIPTION OF THE PRESENT DEVELOPMENT

Figure 1:
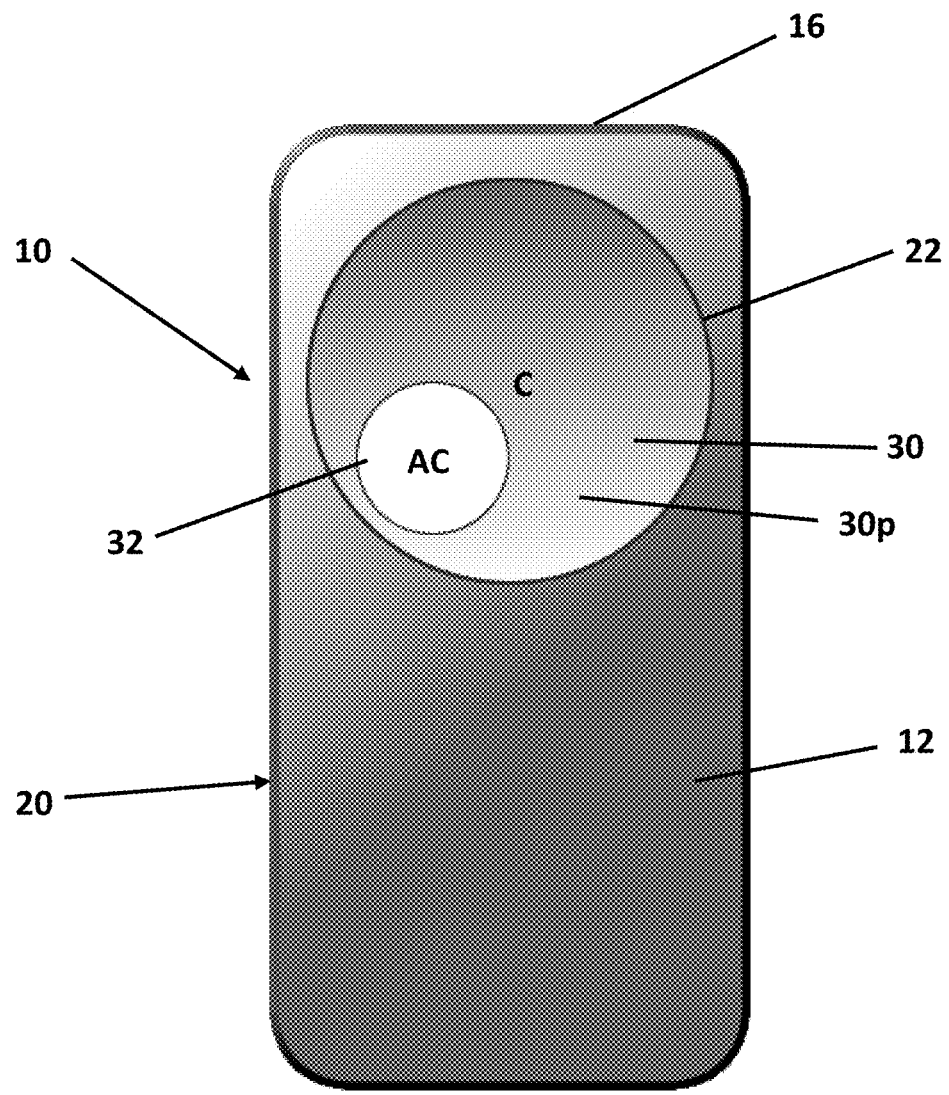
FIG. 1 is a top perspective view of the modified Cornhole platform of the present invention wherein the fixed aperture has been replaced with a rotating disc having a target hole.
Figure 2:
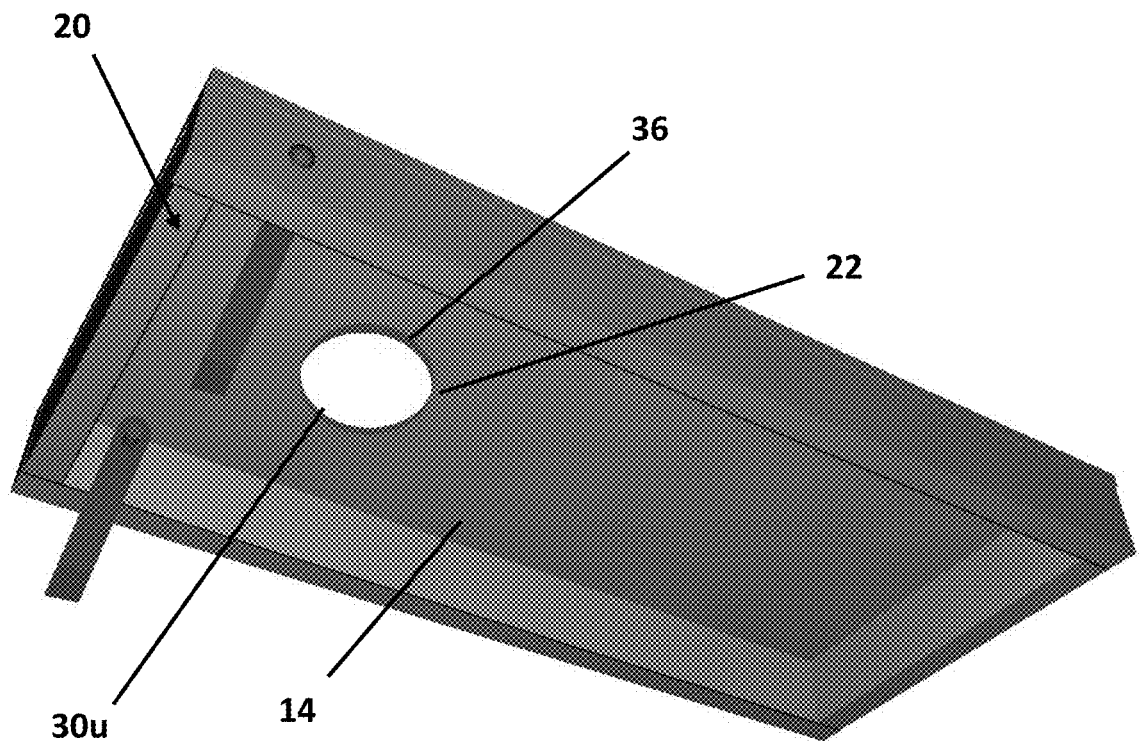
FIG. 2 is a bottom view of the platform of FIG. 1 showing the relative placement of the components for operating the disc.
Figure 3:
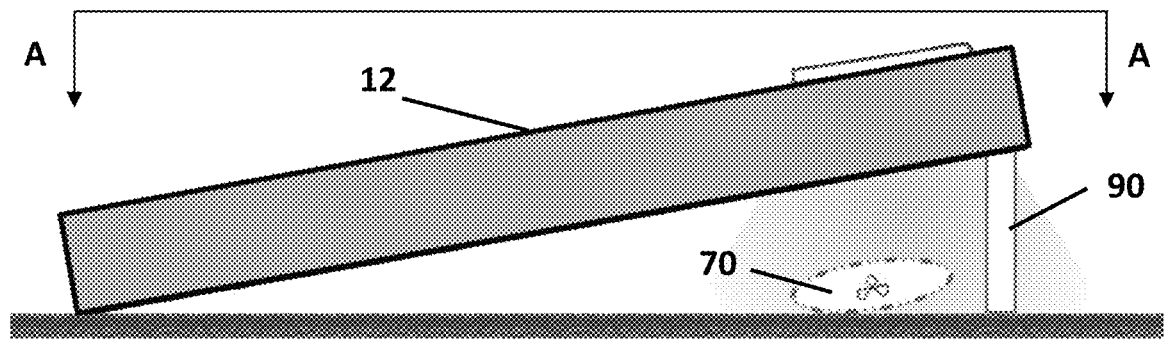
FIG. 3 is a side view of platform of FIG. 1 as set for game play.
Figure 4:
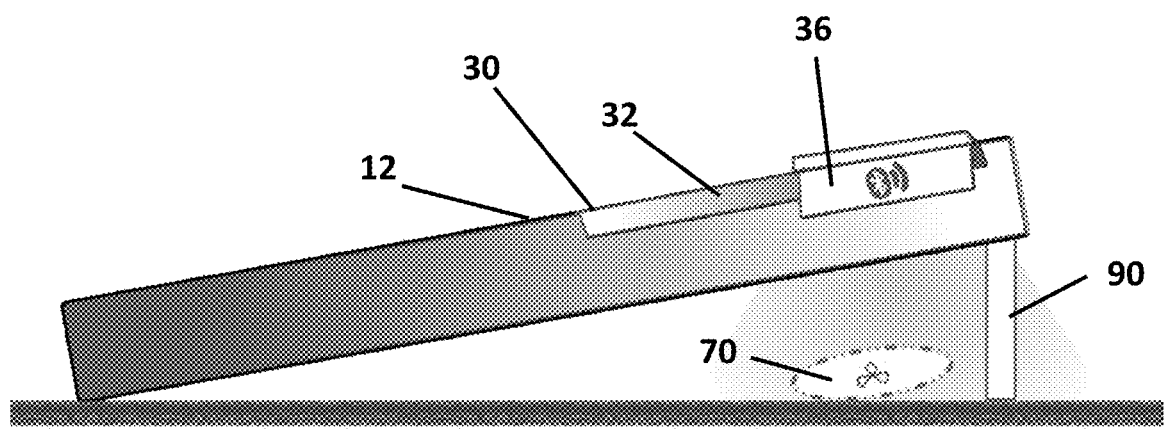
FIG. 4 is a cross-sectional view of the platform of FIG. 3 cut along lines A-A.

The following description is intended to provide the reader with a better understanding of the invention. The description is not intended to be limiting with respect to any element not otherwise limited within the claims. For example, the present invention will be described in the context of use with a commonly known Cornhole platform, but the teachings herein are not limited to Cornhole games and are intended to be applicable for use with any system or platform wherein a projectile is used and the objective is to land in or upon or in a specified proximity to or to pass through or impact the projectile in a predetermined location.

The present development is a system for participating in a multi-player projectile tossing game through IoT digital arenas. The system comprises a playing surface with a target wherein the target comprises a low-energy proximity sensor, a projectile tagged with a digital transponder, and a mobile computing device in wireless communication with the proximity sensor and the digital transponder. Optionally, a player may also be tagged with a digital transponder and be in wireless communication with the mobile computing device.

The present development is best described by example, such as with a Cornhole game or bag toss game apparatus. As shown in FIGS. 1-4, the bag toss game apparatus 10 of the present development comprises a Cornhole platform or board 20 that defines a playing surface 12 and an underside surface 14, and that has at least one aperture 22 near a target end 16. The aperture end 16 is slightly elevated for game play. As is known in the art, the platform elevation may be accomplished by use of legs 90 attached to the underside 14 of the platform 20.

Positioned in the platform aperture 22 is a disc 30. The disc 30 defines a center C and a platform face 30p and an underside face 30u and has at least one disc aperture 32 having a fixed position. The disc aperture 32 defines a center AC and the aperture is positioned such that the disc aperture 32 is off-center relative to the center of the disc. That is, AC is not in linear alignment with C.

The disc 30 is adapted to rotate within the platform aperture 22. Rotation of the disc is controlled by a set of gears 34 (not shown) that are adapted to be wirelessly commanded, controlled, communicated and interacted with by at least one mobile computing device 40.

The disc aperture 32 comprises an IoT beacon ring 36. The IoT beacon ring 36 is a low-energy proximity sensor, such as but not limited to a Bluetooth Gateway. In a preferred embodiment, the sensor 36 is positioned on the underside face of the disc 30u, preferably close to the disc center C. Alternatively, if the playing surface is the target the sensor may be positioned within the playing surface. The IoT beacon 36 is configured to allow the IoT beacon 36 to be in wireless communication with digital Bluetooth ("BT") tags, data receivers and mobile computing devices.

In an alternative embodiment, an exit chute (not shown) may be mounted on the platform underside surface 14 or on the disc underside surface 30u to allow a bag 70 tossed through the disc aperture 32 to slide away from the ring 36. In an exemplary embodiment, the exit chute is a right circular cone shaped half sphere or spinning top shaped object rotates in tandem with the disc 30 and that propels the bag 70 out of the underside area and out of the range of the ring 36.

As is known in the art, the game of Cornhole is played by tossing a projectile, such as a bean bag, 70 or similar object from a predetermined distance onto the playing surface 12 of the Cornhole platform 20. More specifically, the objective is to toss the bean bag through the aperture 32. A player receives points if the bag 70 lands and remains on the platform face 12 or if the bag passes through the aperture 32, but the player receives more points for tossing the bag through the aperture 32, than for landing on the platform 12.

By including a low-energy proximity IoT beacon 36 in the platform 20 of the present development, the platform 20 can be placed in wireless communication with a digital-transponder tagged projectile or bean bag 70 and concurrently with the at least one mobile computing device 40. The digital tag for the bean bag 70 may be inserted into the bag as part of the bag contents or it may be imprinted on or affixed to the surface of the bag. As is known in the art, each digital tag can be programmed with a unique identifier so each bag can be individually recognized by the IoT beacon 36. Exemplary low-energy proximity sensors include Bluetooth Low Energy (BLE) Beacon hardware, IoT tag hardware, or similar devices that broadcast a simple signal of basic information at a specific programmed interval. Exemplary digital tags include battery free Bluetooth transponders, stamps, tags or similar devices that interact with the signal broadcast by the IoT beacon "ring" to register game play events and interactions such as scoring, tracking, physical proximity, and play time. Game play experience events such as scoring, time, number of players or participants and other values are communicated from the ring and bags to electronic hardware and software on and within the game board to connected mobile computing devices.

Optionally, a player may be digitally tagged to allow for digital interaction between the player and the playing surface 12 or between the player and the means to interact with the playing surface or a combination thereof. The player's tag is similar to the projectile tag—that is, the player's tag is a digital transponder. As with the tagged bean bag 70, the low-energy proximity IoT beacon 36 in the platform 20 can be placed in wireless communication with a digital-transponder tagged player and concurrently with the at least one mobile computing device 40. As is known in the art, each digital tag can be programmed with a unique identifier so each player can be individually recognized by the IoT beacon 36. The movements of the tagged player can then be tracked relative to the playing surface and the projectiles by the mobile computing device.

Figure 5:
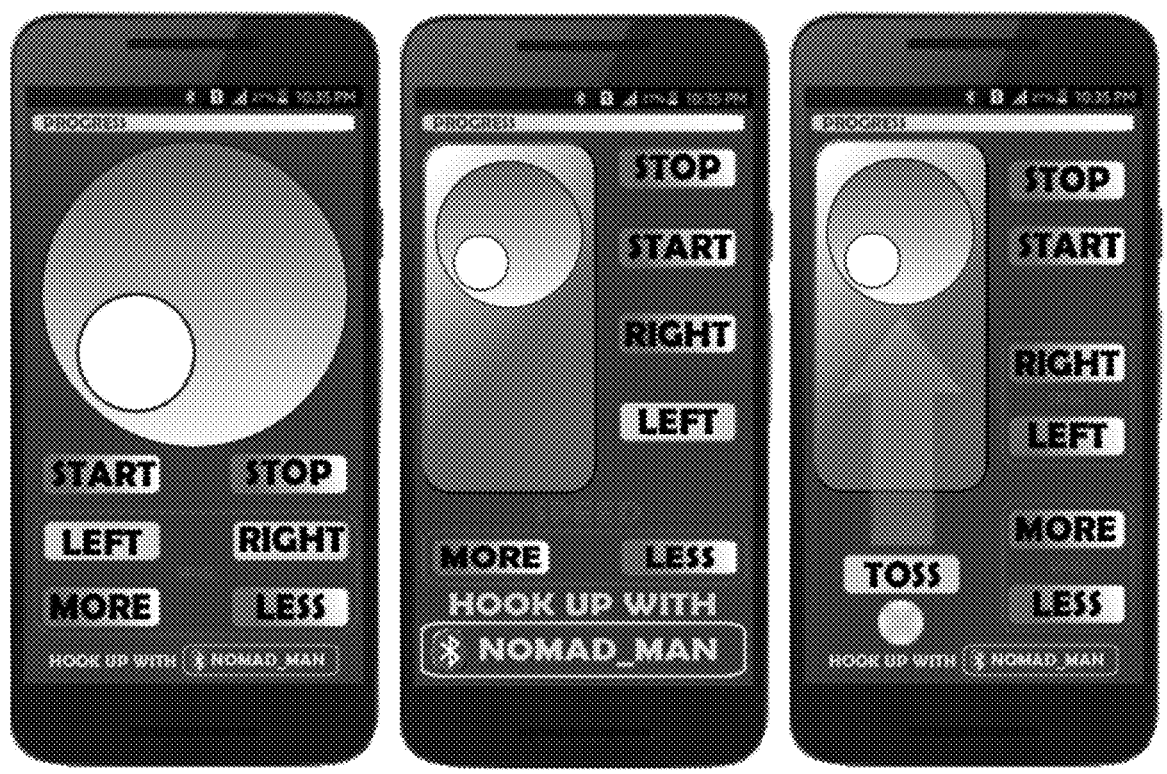
FIG. 5 is a screenshot view of a first embodiment of a software application for a mobile computing device interface and platform of FIG. 1; and, FIGS. 6A-6E are a set of flowcharts for using the bag toss game apparatus of FIG. 1 as a game.
Figure 5:
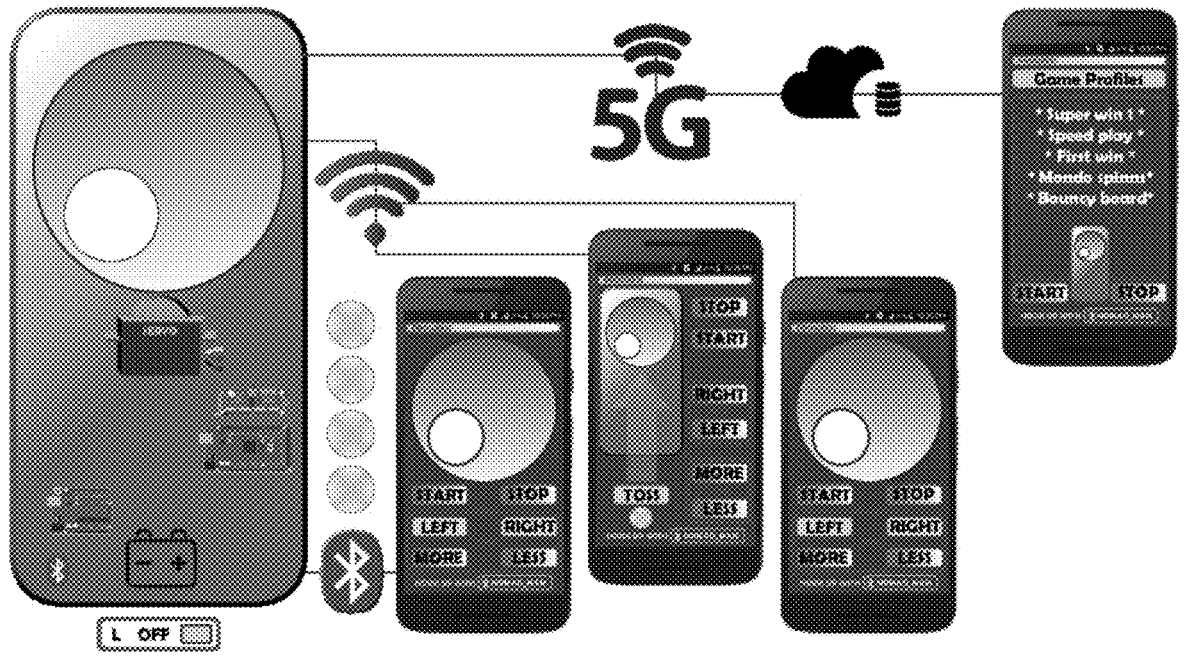

Exemplary mobile computing devices to be used with the present invention include but are not limited to: desktop-laptop-tablet computers, smartphones, smart wearable clothing/gear, gaming consoles, or such mobile computing devices that may connect to the Internet and Internet of Things ("IoT") and may run software that enable connectivity to the present invention and platform to enable game play experiences. FIG. 5 shows a plurality of screenshots demonstrating variations of a software application for a mobile computing device platform of FIG. 1.

The following exemplary embodiment is provided to give the reader a mental picture of the development and is not intended to be limiting with respect to any element not otherwise limited within the claims. In the exemplary embodiment, the platform comprises a board having length and width dimension of about 48" by about 24", respectively. The board has a thickness of about 4" and defines a face and a back. Optionally, a frame having a depth of about 3" may attached to the back. A pair of legs are attached to the underside of the platform to raise the aperture end of the platform about 12" off the ground. The opposing end rests on the ground. At the aperture end is the rotating disc having a diameter of about 18". The disc aperture having a diameter of about 7" is positioned about 0.75" from the edge of the rotating disc. The rotating disc is controlled by a set of gears that, when activated, will cause the disc to rotate either clockwise or counterclockwise and that will adjust the speed of rotation. In a first embodiment, the gear direction is manually selected by a player within physical proximity of the bag toss game apparatus. In a second embodiment, the gear box may be in communication with the mobile computing device and a player may alter the direction or speed of the gearing by entering commands into the mobile computing device.

FIGS. 6A-6E are flowcharts showing exemplary processes for game play. There must always be at a minimum one physical player engaged in a game play experience. The simplest variation of play is demonstrated in the flowchart of FIG. 6A. In this game play variation, Variation A, one or more primary physical players toss one or more bags 70 at the one or more boards 20—as is known in the art, traditional Cornhole is played with two boards—in accordance with game play rules. In Variation A, the board 20 is not connected to the IoT, and the game may be played with or without activation of the game electronic systems: if the game is in "Off" mode, the target area is not moving; if the game is in "On" mode, the target area of the board rotates automatically in either a clockwise or counter-clockwise direction at variable speeds and may start and stop, as randomly determined by the processor/servo motor apparatus. In game Variations B-E, in each embodiment, when the game electronics are activated, a series of self-diagnostic tests are conducted and then the sensor broadcasts a BLE continuous signal and a trigger event seeking transponders or tags. If tags are detected, the tag identifications are registered for game play. Colored lights may be included to indicate game events. When the sensor determines that a tagged bag has passed through the aperture, the sensor sends a signal to the mobile computing device to register and record a game event and, optionally, lights on the platform provide a visual display indicating a point score. Optionally, the game may be played with bean bags that have no digital tags and the apparatus may be programmed to provide a light display when the bag passes through the aperture. A further optional feature may include automatic shutdown after a predetermined period of inactivity to preserve battery life. Specifically, the flowchart of FIG. 6B, Variation B, is for game play with two or more players in the same geographic location. In Variation B, the board 20 is connected to the IoT—Bluetooth and the game is played with activation of the game electronic systems. The ring may or may not be activated: if the ring is in "Off" mode, the target area is not moving; if the ring is in "On" mode, the target area of the board rotates automatically in either a clockwise or counter-clockwise direction at variable speeds and may start and stop, as randomly determined by the processor/servo motor apparatus. Each player connects his or her Mobile Computing Device (MCD) via BT and a software application enabling Command, Control, Communication and Interaction (CCCI) with one of the game play boards—in a traditional Cornhole game, two boards are used. Only one player (physical or virtual) may connect to one board at any one time. Variation C of FIG. 6C activates the gameboard following steps similar to Variation B, however Variation C provides options to allow for more players to participate and for players to be in the same geographic location or participating from a distant geographic location or participating as virtual players or virtual participants. In Variation C, the primary player uses an MCD and a software application is enabled via a connection to the IoT (Wi-Fi/5G) to allow a virtual player or virtual participant to engage in a game play experience (GPE) during active GPE session. Virtual play can optionally control the rotation attributes of the target area via software on the MCD of said virtual player and/or tossing virtual bags at a virtual representation of a board on the virtual player's MCD during the game play experience. Alternatively, the virtual participation can be limited to primarily controlling the rotation attributes of the target area via software on the MCD of said virtual participant. Variation D of FIG. 6D is similar to Variation C except the platform allows for many players to participate simultaneously, including virtual players or virtual participants, and the players may engage in tournament play. Variation E of FIG. 6E is similar to Variation C except a virtual player or virtual participant is the digital manifestation (avatar) of a specific player's previous game interaction with a player's actual physical game, session or tournament wherein a virtual player/participant can engage in game play; without actually being physical present, active or even awake; by allowing their previous physical game play data, actions, events and response to be applied during another physical player/s game. There is no machine learning or artificial intelligence in this effort; as we have a limited amount of game play experience variables. It is merely taking the virtual player/s—participant/s previous actions and applying them during a physical game play experience via a MCD and a backend cloud server environment.

Game play participants may communicate, command, control and interact with the game platform by means of a software interface on a mobile computing device that interfaces with the electronic and mechanical components of the game board and backend server, such as a cloud service. The participant has the option of playing 1) stand alone, 2) connecting only to their local mobile computing device, 3) connecting to a local area network of physical or virtual (player/s and/or participant/s), or 4) connecting to their mobile computing device and connecting to a backend server/cloud environment. The virtual participant can connect via the backend server/cloud environment to any single or number of game boards and game play experiences.

Optionally, the disc 30 may be adapted to include features to enhance the entertainment value of the bag toss game apparatus 10. For example, LED light strips may be included for color visual feedback or devices to include sound effects may be included. A battery connection and storage case may be included to allow the electronic elements of the apparatus to operate off the battery rather than requiring electric cords and electrical outlets.

As noted supra, the present development is intended to be used with any game that comprises a playing surface and a projectile. With the understanding that the general mechanics of each game are well known in the art, following are some other potential uses for the present invention.

Lawn Darts. The traditional game of Lawn Darts involves a player tossing a projectile, a lawn dart, with the objective being to have the lawn dart land within a ring placed on the ground. The present development can be implemented into the Lawn Darts game by placing an IoT beacon on the ground in place of the traditional ring and enabling the IoT beacon signal to be and define the ring or target area, and placing a digital transponder tag in each projectile, and having the IoT beacons and the projectile tags communicate with the mobile computing device.

Disc Golf. The traditional game of Disc Golf involves a player tossing a projectile, a flying disc, with the objective being to have the flying disc land within a basket mounted on a post. The present development can be implemented into the Disc Golf game by placing an IoT beacon into each basket and placing a digital transponder tag in each flying disc, and having the basket beacons and the disc tags communicate with the mobile computing device. As with the aperture in the Cornhole game, the positioning of the basket may be controllable remotely.

Bocce. The traditional game of Bocce involves a player tossing a projectile, a bocce ball, with the objective being to have the bocce ball land close to, and preferably abutting, a target ball or "jack". The present development can be implemented into the Bocce game by placing an IoT beacon into the jack and placing a digital transponder tag in each bocce ball, and having the jack beacon and the ball tags communicate with the mobile computing device. As with the aperture in the Cornhole game, the positioning of the jack may be controllable remotely.

Curling. The traditional game of Curling involves a player pushing off a projectile, a curling stone, onto an ice surface with the objective being to have the curling stone stop its movement within a designed target area on the ice. To aid the curling stones movement and to direct the stone toward the target, the ice is broom swept by the stone's team members. The present development can be implemented into the Curling game by placing an IoT beacon within the target area and placing a digital transponder tag in each curling stone, and having the target beacon and the stone tags communicate with the mobile computing device. Similar to the variability that can be introduced by the rotating aperture in the Cornhole game, the movements on the "swept" ice may be controllable remotely.

Optionally, the "target" and/or "projectiles" may be one or more game players rather than inanimate objects. Using this option, the target would be the player carrying or wearing the beacon and the projectiles would be the player(s) carrying or wearing the transponder tags. The game could be conducted with an inanimate target and player projectiles or with a player target and inanimate projectiles or with a player target and player projectiles. Without limitation, following are some other potential uses applications with player roles.

Scavenger Hunt. The traditional game of Scavenger Hunt involves an object being hidden and players following clues to find the object. The present development can be implemented into the Scavenger Hunt game by placing an IoT beacon into each hidden object and placing a digital transponder tag on each player, and having the object beacons and the player tags communicate with the mobile computing device, such as to indicate when the player is within a predetermined distance of the hidden object.

9 Square in the Air: The traditional game of 9 Square in the Air involves a plurality of players arranged within a 3×3 pattern, wherein one player begins the game by tossing a projectile, a ball, into the air and all the players then try to keep the ball from hitting the ground. The present development can be implemented into the 9 Square game by placing an IoT beacon on each player and placing a digital transponder tag in the ball, and having the player beacons and the ball tags communicate with the mobile computing device, such as to indicate when the ball is within a given physical range of a particular player.

Hide and Seek. The traditional game of Hide and Seek involves one player finding a hiding and at least one other player searching for the hidden player. The present development can be implemented into the Hide and Seek game by placing an IoT beacon on the player designated to hide and placing a digital transponder tag on each player designated to seek, and having the hider's beacon and the seeker's tags communicate with the mobile computing device, such as to indicate when the seeker is within a given physical range of the hiding player.

The applications provided herein are for example purposes only and are not intended to be limiting with respect to any element not otherwise limited within the claims.

Unless defined otherwise, all technical and scientific terms used herein have the same meaning as commonly understood by one of ordinary skill in the art to which the presently disclosed subject matter pertains. Representative methods, devices, and materials are described herein, but are not intended to be limiting unless so noted.

The terms "a", "an", and "the" refer to "one or more" when used in the subject specification, including the claims.

Unless otherwise indicated, all numbers expressing quantities of components, conditions, and otherwise used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, or percentage can encompass variations of, in some embodiments ±20%, in some embodiments ±10%, in some embodiments ±5%, in some embodiments ±1%, in some embodiments ±0.5%, and in some embodiments to ±0.1%, from the specified amount, as such variations are appropriate in the disclosed application.

Specific dimensions relevant to the game apparatus are provided herein for the purpose of demonstrating the invention, but these dimensions are not intended to limit the scope of the invention. It is understood that, in light of a reading of the foregoing description, with ordinary skill in the art may make alterations and/or modifications to the present invention, and specifically to the embodiments shown and described herein, without departing from the scope of the invention.

What is claimed is:

1. A system for a multi-player projectile-target game comprising (a) a playing surface with a target having a low-energy proximity sensor, wherein the target defines a configuration that can be altered during game play, (b) a projectile tagged with a digital transponder, and (c) at least one mobile computing device programmed with an application for a player to communicate, command, control and interact ("CCCI") with the playing surface, target, projectile, a backend server, or a combination thereof, wherein the proximity sensor, the digital transponder, the mobile computing device, and the backend server are in wireless communication with each other, and wherein the playing surface is a cornhole board and the target is a platform aperture in the cornhole board and the tagged projectile is a tossing bag, and wherein the platform aperture further comprises a rotating disc, wherein the rotation of the disc is controlled by a set of gears that are adapted to be wirelessly commanded, controlled, communicated and interacted with by at least one mobile computing device.

2. The system of claim 1 wherein the low-energy proximity sensor is selected from Bluetooth Low Energy (BLE) Beacon hardware, IoT tag hardware, devices that broadcast a simple signal of basic information at a specific programmed interval, or combinations thereof.

3. The system of claim 1 wherein the digital transponder is selected from battery free Bluetooth transponders, stamps, tags devices that interact with a signal broadcast by an IoT beacon, or combinations thereof.

4. The system of claim 3 wherein each digital transponder is programmed with a unique identifier so each projectile can be individually recognized by the proximity sensor.

5. The system of claim 1 wherein the projectile is tagged with the digital transponder by inserting the transponder into the projectile or by imprinting the projectile with the transponder or by affixing the transponder to the surface of the projectile.

6. The system of claim 1 wherein the mobile computing device is selected from a desktop computer, a laptop computer, a tablet computer, a smartphone, smart wearable clothing/gear, a gaming console, a device that connects to the Internet and Internet of Things ("IoT") and runs software that enables connectivity to the present invention, or combinations thereof.

7. The system of claim 1 wherein the tagged projectile is a physical projectile or a virtual projectile.

* * * * *